US005969838A

United States Patent [19]

Paritsky et al.

[11] Patent Number: 5,969,838

[45] Date of Patent: Oct. 19, 1999

[54] SYSTEM FOR ATTENUATION OF NOISE

[75] Inventors: Alexander Paritsky, Jerusalem; Alexander Kots, Ashdod, both of Israel

[73] Assignee: Phone Or Ltd., Israel

[21] Appl. No.: 08/760,900

[22] Filed: Dec. 6, 1996

Related U.S. Application Data

[63] Continuation-in-part of application No. 08/567,636, Dec. 5, 1995, Pat. No. 5,771,091.

[30] Foreign Application Priority Data

Dec. 7, 1995 [IL] Israel ........................................ 116274

[51] Int. Cl.$^{6}$ ........................................ H04B 10/02

[52] U.S. Cl. ............... 359/150; 250/227.14; 250/227.25; 250/231.19; 367/149

[58] Field of Search .................................... 359/150, 151, 359/173; 381/172, 111; 250/231.19, 227.21, 227.14, 227.11; 367/149

[56] References Cited

U.S. PATENT DOCUMENTS

| | | | |
|---|---|---|---|
| 2,350,010 | 5/1944 | Beekley | 179/1 |
| 3,004,103 | 10/1961 | Hart | 179/1 |
| 4,071,753 | 1/1978 | Fulenwider et al. | 367/149 |
| 5,146,083 | 9/1992 | Zuckerwar et al. | 359/150 |
| 5,200,610 | 4/1993 | Zuckerwar et al. | 250/231.19 |
| 5,262,884 | 11/1993 | Buchholz | 359/150 |
| 5,333,205 | 7/1994 | Bogut et al. | 359/150 |
| 5,402,508 | 3/1995 | O'Rourke et al. | 250/227.14 |
| 5,771,091 | 6/1998 | Paritsky et al. | 250/227.25 |

OTHER PUBLICATIONS

Bradley, et al., "Refractive Fiber Optic Microphones with Ambient Acoustic Noise–Cancelling Capabilities", *Journal of Acoustic Society of America*, 98(3):1612–1617, Sep. 3, 1995.

Kerem, Samuel, "Dual microphones separate voice from noise", *EDN—Electrical Design News*, 39(13):82, Jun. 23, 1994.

Patent Abstracts of Japan, vol. 10, No. 165 (P–467), Jun. 12, 1986 & JP 61 018916 A (Nippon Denki), Jan. 27, 1986. Abstract.

*Primary Examiner*—Jeffery A. Hofsass
*Assistant Examiner*—John Tweel, Jr.
*Attorney, Agent, or Firm*—Townsend and Townsend and Crew LLP

[57] ABSTRACT

A noise attenuation system for use with sound receiving devices, including first and second relatively small optical microphone devices having at least one sound responsive membrane operative to produce an output signal in accordance with sound waves picked up by the optical microphone devices, at least one pair of light guides affixed to the first or second optical microphone devices, the pair of light guides each having an input end portion and an output end portion, the input end portion of a first light guide is connectable to a source of light and the output end portion of the second light guide is connectable to a light intensity detecting means. Each of the output portion of the first light guide and input end portion of the second light guide has an axis and a rim and is oriented with respect to each other to include an angle between the axes, and each of the light guide rims is cut at an angle with respect to the axis of its light guide. In operation, the intensity of light reflected by the membrane and detected by the light intensity measuring means, represents the difference in sound intensities picked up by the first and second optical microphone devices.

12 Claims, 5 Drawing Sheets

SYSTEM FOR ATTENUATION OF NOISE

This invention is a Continuation-in-Part of the application Ser. No. 08/567,636 filed Dec. 5, 1995, now U.S. Pat. No. 5,771,091.

BACKGROUND OF THE INVENTION

The present invention relates to a system for attenuation of noise for use with sound receiving devices. More particularly, the present invention is concerned with a system for attenuating acoustic background sounds in devices employing a microphone for receiving and utilizing sound waves applied thereto.

As experienced by many, background sounds, which will be referred to hereinafter as "noise", in accordance with the commonly acceptable definition thereof, which is "undesired sound", are very disturbing when, for example, conducting a telephone conversation from outdoor telephone booths or when using a microphone to broadcast information from outside premises, such as sports fields or arenas, and other like locations.

There are known in the art several techniques for noise suppression. The first one utilizes a special construction of a microphone providing different sensitivities to sound waves, reaching the microphone from different directions. Such microphones, known as directional microphones, suffer, however, from the obvious disadvantage of not being able to provide a satisfactory solution to sound received from directions other than the two preset, very distinct directions.

Another known noise cancelling technique utilizes electronic generation of "anti-noise" signals precisely out of phase with the incoming noise signals. This technique involves digital processing of sound signals and the irradiation of noise signals into space, out of phase with the phase of the incoming noise signals, so as to cancel out only the incoming noise signals.

A more common noise cancellation technique employs several individual microphones disposed in spaced-apart relationship producing output signals corrresponding to the sound picked up thereby, which signals are then processed and delayed in different ways to obtain an improved signal to noise ratio. This technique is also quite involved and necessitates special equipment.

SUMMARY OF THE INVENTION

It is therefore a broad object of the present invention to provide a system for noise attenuation independent of direction, utilizing optically operated microphone devices.

It is a further object of the present invention to provide a system for noise attenuation having an improved signal to noise ratio, utilizing optically operated microphone devices.

In accordance with the present invention there is therefore provided a noise attenuation system for use with sound receiving devices, comprising first and second relatively small optical microphone devices having at least one sound responsive membrane operative to produce an output signal in accordance with sound waves picked up by said microphone devices, at least one pair of light guides affixed to said first or second microphone devices, said pair of light guides each having an input end portion and an output end portion, the input end portion of a first light guide being connectable to a source of light and the output end portion of said second light guide being connectable to a light intensity detecting means, each of the output portion of said first light guide and input end portion of said second light guide having an axis and a rim and being oriented with respect to each other to include an angle between said axes, and each of said light guide rims being cut at an angle with respect to the axis of its light guide, wherein in operation, the intensity of light reflected by said membrane and detected by said light intensity measuring means, represents sound intensities picked up by said first and second microphone devices, or the differences between said intensities.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
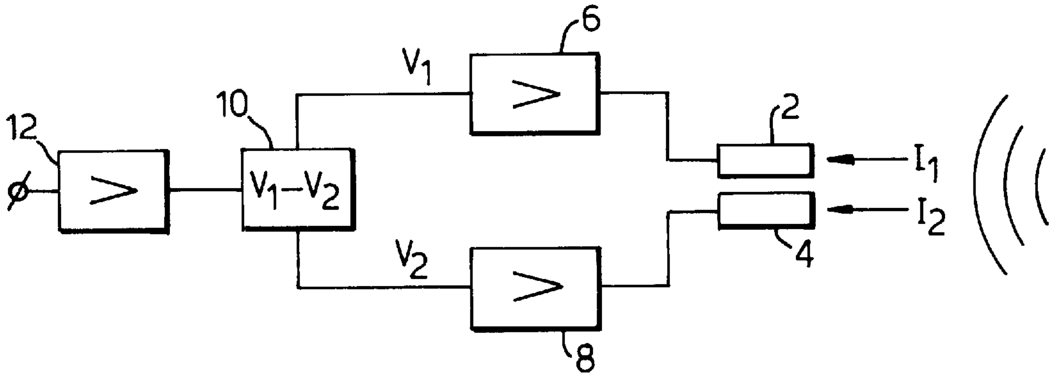
FIG. 1 is a block diagram exemplifying principles of the system for attenuation of noise according to the present invention.

In FIG. 1 there is schematically illustrated the principles of a system for attenuation of noise, according to the present invention. Seen are two optical microphone devices 2 and 4 positioned in close proximity to each other. Each microphone device leads via an operational amplifier 6 or 8 to a substraction circuit 10 in which the signals, representing sound intensities picked up by the microphone devices, are substracted from each other. The subtracted output signal may then be amplified at amplifier 12, prior to being further utilized.

The microphone devices 2 and 4 are relatively small and preferably of the type described and illustrated in Israel Patent Specification No. 111,913, filed Dec. 7, 1994. The fact that at least the sound pick up elements, e.g., a sound responsive membrane of the microphone devices, are very small, enables the disposition of the elements very close to each other, so that for acoustical waves originating at a far distance, the elements are effectively located at the same place and thus substantially equally sensing the incoming waves. This, of course, is the situation when the microphone devices are designed to have the same sensitivity and phase characteristics. Similarly, the amplifiers 6 and 8 are designed to provide the same amplification and phase characteristics. Hence, the output signal from the subtraction circuit 10 or amplifier 12, will be very small or close to zero. This can be better understood from the following mathematical derivation.

Assuming that the intensity I of sound at the point of microphone device is $$I=I_O/4\pi L$$

where $I_O$ is the intensity of the sound source, and

L is the distance to the sound source, and supposing that the distance to the far (noisy) source of sound from the first microphone device is $L_1$ and from the second microphone device is $L_2$, the distance from both microphone devices to the source of near (informative) sound is $L_3$ and $L_4$, so that $$L_1-L_2=L_3-L_4=\Delta L$$

where, L is the distance between two microphone devices, and assuming that $L<<L_1, L_2$;

and that $L(\text{near})=L_3,L_4<<L(\text{far})=L_1, L_2$, then, under these suppositions, the difference in sound intensities between both microphone devices will be:

$$\Delta I(\text{far})=I_{of}/4\pi L_1-I_{of}/4\pi L_2=(I_{of}/4\pi L(\text{far}))\times(\Delta L/L(\text{far}))$$

$$\Delta I(\text{near})=I_{on}/4\pi L_3-I_{on}/4\pi L_4=(I_{on}/4\pi L(\text{near}))\times(\Delta L/L(\text{near}))$$

If the intensities of sound near both microphone devices from the far source and from the near source will be the same:

$$I_{on}/4\pi L(\text{near})=I_{of}/4\pi L(\text{far})$$

sound signal/noise ratio k, will be:

$$k=\Delta I(\text{near})/\Delta I(\text{far})=(\Delta L/L(\text{near}))/(L/L(\text{far})=L(\text{far})/\Delta L(\text{near})>>1$$

Assuming that the intensity of the far (noisy) sound is the same as the intensity of the near (informative) sound, the devised sound attentuation system will suppress the far sound in comparison with the near sound at the ratio of the two distances and the greater the distance to the far sound source relative to the distance to the near sound source, the stronger the attenuation or suppression.

In practice, a source of sound may be considered to be at a far distance if the distance between the sound pick up elements of the microphone devices is 8 to 10 times smaller than the length of the sound waves. Hence, if, e.g., microphone devices are of the type described hereinbefore, wherein, the sound pick up elements of the microphone devices, each having a diameter of about 3 mm, sound arriving from all directions from sources as close as 1 meter and having frequencies up to 10 KHz, will be cancelled.

Figure 2:
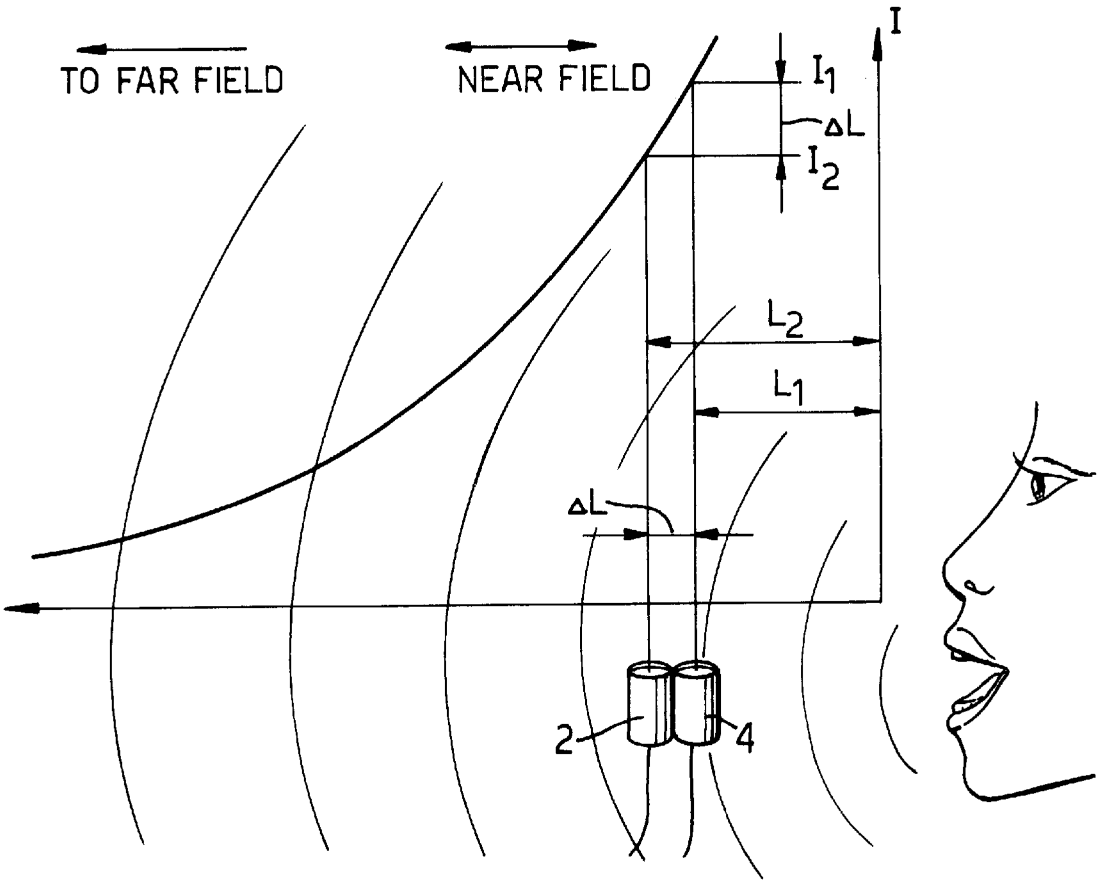
FIG. 2 illustrates an embodiment of microphone devices coupling and orientation utilizable with an acoustic field originating at a near distance.

Referring to FIG. 2, there is illustrated a characteristic curve of a sound intensity vs. distance from sources of sound, depicted in relation to the microphone devices of the type according to the present invention.

As seen, the sound waves originate at a mouth of a speaker, distant a short distance therefrom, i.e., the sounds originate at a close distance from the microphone devices. The speaker's voice at the near field has the characteristic of a spherical field, as depicted by the spherical curves. Other prevailing sounds, originating at far greater distances and regarded as far field sounds, possess characteristics of a plane field. Hence, while the sound intensity of the spherical waves are substantially the same along the sphere's surface or envelope and changes along the sphere's radius, this is not the case with a plane field. In the latter case the sound intensity is substantially the same on all points of the plane.

Figure 3:
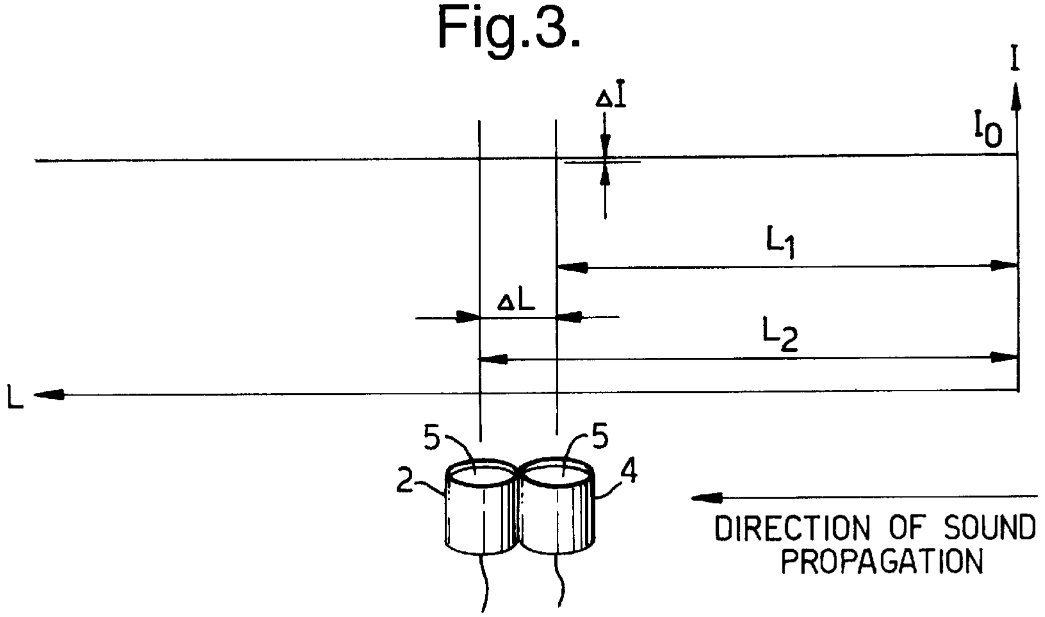
FIG. 3 illustrates an embodiment of microphone devices coupling and orientation utilizable with an acoustic field originating at a far distance.

Referring to FIG. 3, there is seen that when the microphone devices 2 and 4, each having a membrane 5, are placed in close proximity to each other at a distance ΔL, where L is the distance from a source of sound, then the sound intensities $I_2$ and $I_4$ respectively, in each microphone device are:

$$I_2 = I_o/4\pi L_2^2 \quad \text{and} \quad I_4 = I_o/4\pi L_4^2$$

$$\Delta I = I_2 - I_4 = I \times 1/4\pi(1/L_2^2 - 1/L_4^2) = I_o \times 1/4\pi L^2 \times \Delta L/L$$

$$\text{where} \quad L = L_2 + L_4/2$$

$$\Delta L = L_2 - L_4; \qquad \Delta L <<< L$$

$$L \cong L_2 \cong L_4; \qquad \Delta L/L <<< 1, \text{ and}$$

$$\text{hence} \quad \Delta I = 0.$$

Since the desired sound originates at the speaker's mouth and the sound waves or pressure change from point to point along the radius of the acoustical spherical field, a barrier 14 (FIG. 4) placed across the acoustical wave travel path and located between the two microphone devices 2 and 4, will increase the difference between the output signals of the microphone devices, thereby improving the sound to noise ratio. Thus, as seen in FIG. 4, the barrier 14 in the form of a small and thin plate, disc, or the like element, affixed in between the two microphone devices 2 and 4, increase the difference in the sound intensities picked up by each microphone device.

Figure 5A:
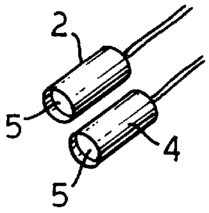
FIGS. 5*a*, 5*b*, 5*c*, 5*d* and 5*e* illustrate a plurality of possible dispositions of two microphones devices with respect to each other.
Figure 5B:
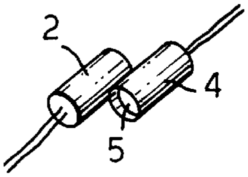
Figure 5C:
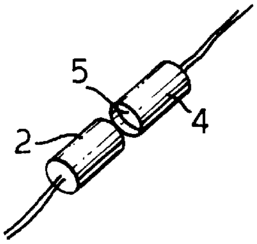
Figure 5D:
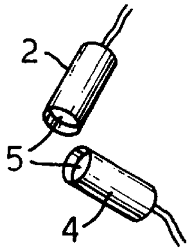
Figure 5E:
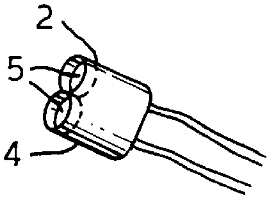

Referring now to FIGS. **5*a* to 5*e*, there are illustrated a plurality of possible relative dispositions of the pair of microphone devices with respect to each other, while maintaining close proximal relationship between their active sound pick up elements, e.g., membranes. As seen in FIG. 5*a*, the microphone devices 2 and 4 are disposed with the plane of their membranes substantially parallel with respect to each other. In FIG. 5*b*, the microphone devices are also disposed with their membranes 5 substantially at the same plane, however, the microphone devices are oppositely oriented. In FIG. 5*c*, the microphone devices 2 and 4 are disposed along the same axis with their membranes 5 in close proximity to each other, but in opposite directions. Seen in FIG. 5*d* are the microphone devices 2 and 4 disposed with their axis at the same plane, however, at an angle with respect to each other, while the membranes 5 are disposed in close proximity to each other. Finally, in FIG. 5*e* there are seen the two microphone devices 2 and 4, under a common housing, namely, having two separate membranes 5** enveloped in a single housing.

Figure 4:
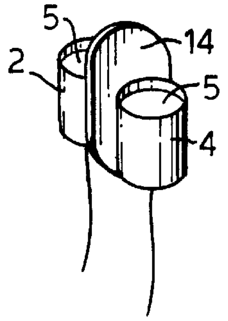
FIG. 4 illustrates still a further embodiment of an arrangement of microphones devices with an acoustical barrier thereinbetween.
Figure 6A:
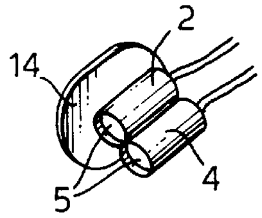
FIGS. 6*a*, 6*b*, 6*c* and 6*d* illustrate a plurality of possible dispositions of an acoustical barrier for various orientations of the two microphone devices.
Figure 6B:
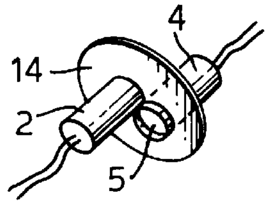
Figure 6C:
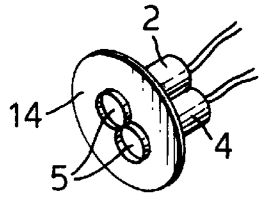
Figure 6D:
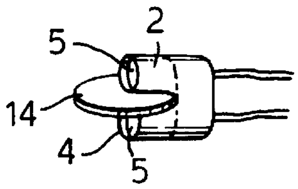

Similar to the embodiment shown in FIG. 4, in order to increase the difference in the intensities picked up by each of the pair of microphone devices, a barrier is affixed onto the devices in a disposition suitable to the relative dispositions of the microphone devices. As seen, the barrier 14 can be affixed in a plane traversing the plane of the two microphone membranes 5 (FIG. 6*a*); in a plane parallel to and in between the pair of membranes 5 (FIG. 6*b*); in a plane parallel to the two membranes 5 (FIG. 6*c*), or in a plane traversing the planes of the membranes 5 and in between the two membranes (FIG. 6*d*).

Figure 7:
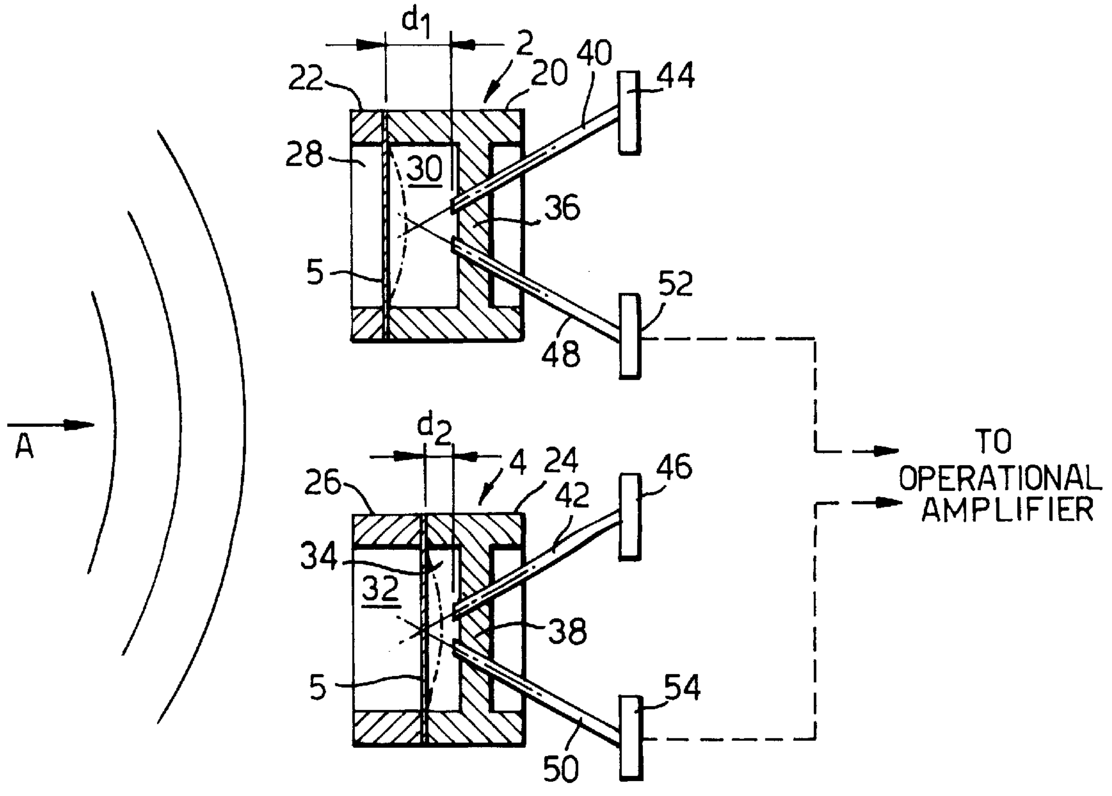
FIG. 7 illustrates the structure of two fiber optic-type microphone devices, utilizable in accordance with the present invention.

The more detailed structure of preferred microphone devices according to the present invention are illustrated in FIGS. 7 to 10. In FIG. 7 there are shown a pair of microphone devices 2 and 4 composed of a two-part housing 20,22 and 24,26, respectively. Interposed between the housing parts is a membrane 5 dividing the interior of the housing into two spaces or chambers 28,30 and 32,34, respectively. The housing parts 20 and 24 are provided with members 36, 38 serving as mounts for an optical guide 40,42 leading to light sources 44 and 46. Similarly, there are provided light guides 48,50 leading to light detectors 52,54. The light guides 40,48 and respectively 42,50, each have an end portion affixed in members 36 and 38 and slightly protruding into chambers 30,34. These end portions have an axis and a rim and are disposed with respect to each other to include an angle between the axes and each of the light guide rims is cut at an angle with respect to the axis of its light guide. For further description of the structure and operation of each microphone device, attention is directed to Israel Patent Specification No. 111,913, the teachings of which are herein incorporated by reference.

Figure 8:
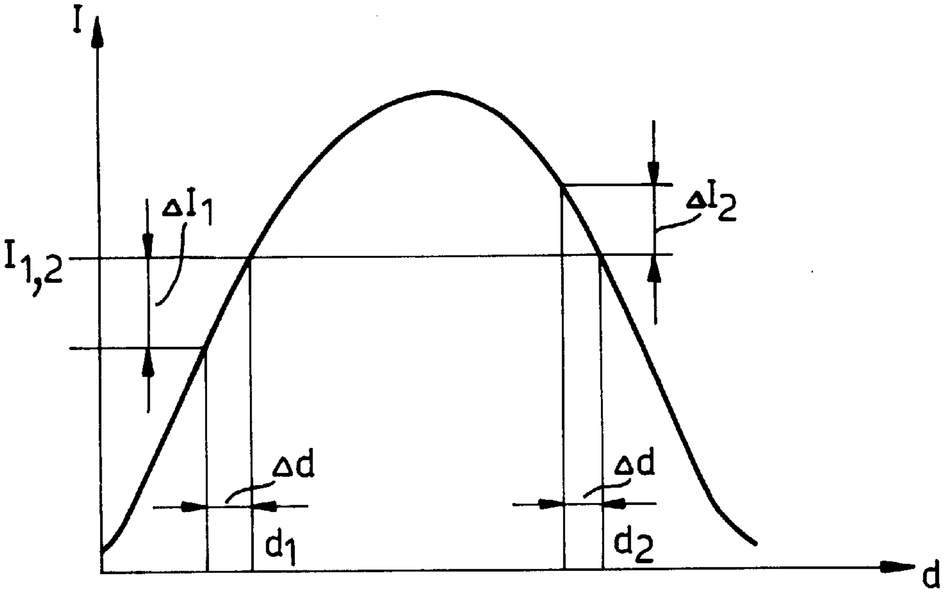
FIG. 8 depicts a light intensity vs. distance graph for better understanding of the operation of the system according to the present invention.

Further seen in FIG. 7 are the different distances $d_1$ and $d_2$ at which the rims of light guides of each microphone device is spaced-apart from its membrane 5. It can thus be understood that upon operation, when sound waves impinge upon the membranes 5, in the direction of arrow A, the latter bulges into chambers 30,34 as depicted by the broken lines. Referring now also to FIG. 8 it is noted that whereas the light intensity in microphone device 2 is increased by $\Delta I$ as the sound wave is picked up by the device, and the membrane 5 is moved by a distance d, for the same movement of the membrane 5 in device 4, the light intensity $I_2$ is decreased. The output signals from devices 2 and 4 are thus fed to an operational amplifier. This type of an arrangement may also be utilized with the two optical microphone devices in which the membrane 5 is equally distant from the rims of the light guides. In this case, the output signals have to be processed by means of an electronic circuit shown in FIG. 1, for summing up of the respective signals, producing an improved signal having a higher signal to noise ratio.

Figure 9:
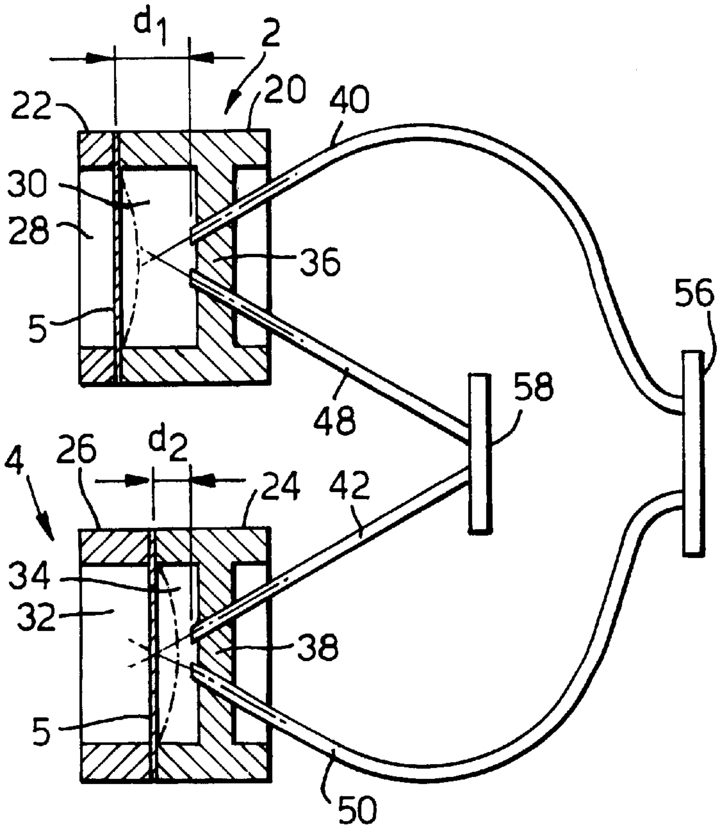
FIGS. 9 to 11 illustrate three different arrangements of the microphone devices according to the invention.

Instead of utilizing two light sources and two light intensity detectors as shown in the embodiment of FIG. 7, it is more efficient to utilize a single light source 56 and a single light intensity detector 58, as shown in FIG. 9. Hence, both microphone devices 2 and 4 are optically connected to a single light source and a single light intensity detector.

Figure 10:
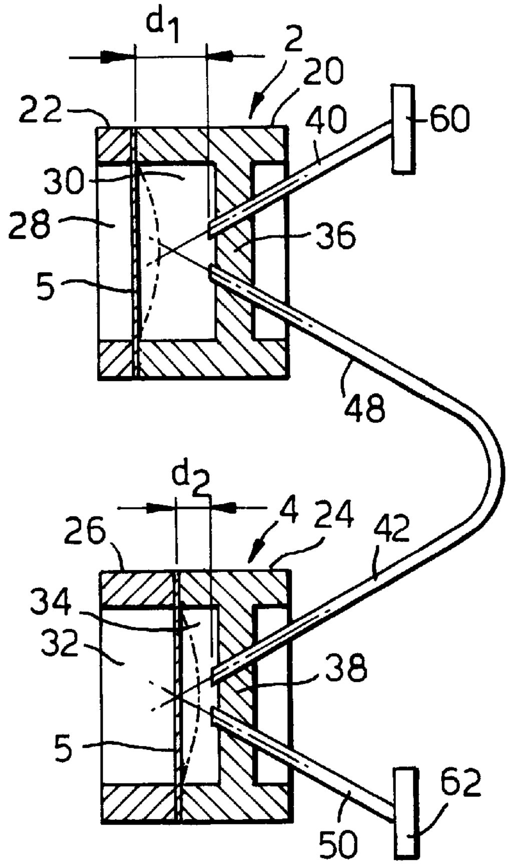

Similarly, in a modification of the embodiment of FIG. 9, in FIG. 10 it can be seen how the ouput light guide 48 of the microphone device 2 is utilized as an input light source via light guide 42 of the microphone device 4, thereby requiring only a single light source 60 and a single light intensity detector 62.

Figure 11:
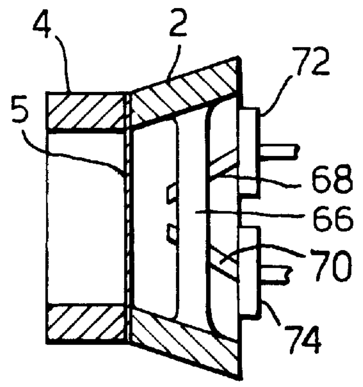

FIG. 11 illustrates a still further modification in which the two microphone devices 2 and 4 share a single membrane 5. The member 66 on which light guides 68 and 70 lead, respectively, to a light source 72 and a light detector 74. Since the single membrane 5 is exposed at both of its surfaces to the incoming sound waves and designed to be substantially equal (by virtue of the configurations of the housings of the devices), when the membrane 5 of the microphone devices are oriented with respect to the travelling sound waves to traverse the direction of travel, the difference between the sound wave pressures upon the two sides of the membrane 5 will be optically detected by the system, thereby improving the signal to noise ratio as explained hereinbefore.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A noise attenuation system for use with sound receiving devices, comprising:

a relatively small optical microphone device having at least one sound responsive membrane affixed in a housing and dividing the interior of the housing into two chambers;

said membrane having two surfaces, each exposed to one of said chambers;

said housing having two oppositely oriented openings allowing sound waves to enter said housing and to impinge on the surfaces of said membrane from two opposite directions;

said membrane being operative to produce an output signal in accordance with sound waves picked up by said microphone device;

at least one pair of light guides affixed to said microphone device;

said pair of light guides each having an input end portion and an output end portion;

the input end portion of a first light guide being connectable to a source of light and the output end portion of a second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide, wherein, in operation, the intensity of light reflected by said membrane and detected by said light intensity detecting means, represents sound intensities picked up by said microphone device or the differences between said intensities.

2. The system as claimed in claim 1, wherein there are provided two microphone devices, each of said devices comprising a membrane and said microphone devices are coupled to each other with said membranes substantially located in a single plane.

3. The system as claimed in claim 1, wherein there are provided two microphone devices, each of said devices comprising a membrane and said microphone devices are coupled to each other with said membranes substantially located in different planes.

4. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

wherein there are provided two microphone devices and said membranes, as mounted in said optical microphone devices, are disposed in opposite directions with respect to each other;

and wherein, in operation, the intensity of light reflected by said membrane and detected by said light intensity detecting means, represents sound intensities picked up by said first and second microphone devices or the differences between said intensities.

5. The system as claimed in claim 1, wherein there are provided two microphone devices disposed with their axes at the same plane, but at an angle with respect to each other.

6. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

a sound barrier affixed onto said device outside said housing and disposed between said first and second optical microphone devices;

and wherein, in operation, the intensity of light reflected by said membrane and detected by said light intensity detecting means, represents sound intensities picked up by said first and second microphone devices or the differences between said intensities.

7. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

wherein the rims of said input and output portions of the light guides in each of said microphone devices are located at a different distance from the membrane when in rest, whereby, in operation, upon said membrane in the first microphone optical device approaching said rims, the reflected light intensity is increased and the movement of the membrane in a direction away from said rims causes a decrease in the detected light, and upon said membrane in the second optical microphone device approaching said rims, the reflected light intensity is decreased and the movement of the membrane in a direction away from the rims, causes an increase in the detected light;

and wherein, in operation, the intensity of light reflected by said membrane and detected by said light intensity detecting means, represents sound intensities picked up by said first and second microphone devices or the differences between said intensities.

8. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

wherein the pair of light guides of said first and second optical microphone devices are connectable to the same source of light and the same light intensity detecting means;

and wherein, in operation, the intensity of light reflected by said membrane and detected by said light intensity detecting means, represents sound intensities picked up by said first and second microphone devices or the differences between said intensities.

9. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

wherein one of said pair of light guides of the f first and second microphone devices are optically interconnected so that in operation the light reflected by the membrane of the f first microphone device and directed into the input end portion of the associated light guide, serves as a source of light to the second microphone device;

and wherein, in operation, the intensity of light reflected by said membrane and detected by said light intensity detecting means, represents sound intensities picked up by said first and second microphone devices or the differences between said intensities.

10. A noise attenuation system for use with sound receiving devices, comprising:

first and second relatively small optical microphone devices having at least one sound responsive membrane operative to produce an output signal in accordance with sound waves picked up by said microphone devices;

at least one pair of light guides affixed to said first or second microphone devices;

said pair of light guides each having an input end portion and an output end portion;

the input end portion of a first light guide being connectable to a source of light and the output end portion of said second light guide being connectable to a light intensity detecting means;

each of the output portion of said first light guide and input end portion of said second light guide having an axis and a rim and being oriented with respect to each other to include an angle between said axes, and each of said light guide rims being cut at an angle with respect to the axis of its light guide;

wherein there are provided two optically microphone devices sharing a single membrane, and, in operation, said membrane is oriented with its surfaces traversing the direction of travel of sound waves to be picked up, whereby the difference of sound intensities picked up by the microphone devices are optically detected;

and wherein, in operation, the intensity of light reflected by said membrane and detected by said light intensity detecting means, represents sound intensities picked up by said first and second microphone devices or the differences between said intensities.

11. The system as claimed in claim 1, wherein there are provided two microphone devices, and said membranes as mounted in said optical microphone devices are disposed in opposite directions with respect to each other.

12. The system as claimed in claim 1, further comprising a sound barrier affixed onto said microphone devices outside said housing and disposed between said microphone devices.

* * * * *